United States Patent
Allen et al.

(10) Patent No.: US 11,575,719 B2
(45) Date of Patent: Feb. 7, 2023

(54) EXCHANGE AND USE OF GLOBALLY UNIQUE DEVICE IDENTIFIERS FOR CIRCUIT-SWITCHED AND PACKET SWITCHED INTEGRATION

(71) Applicant: BlackBerry Limited, Waterloo (CA)

(72) Inventors: Andrew Michael Allen, Hallandale Beach, FL (US); Adrian Buckley, Tracy, CA (US)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 17/520,409

(22) Filed: Nov. 5, 2021

(65) Prior Publication Data
US 2022/0060443 A1    Feb. 24, 2022

Related U.S. Application Data

(63) Continuation of application No. 16/813,473, filed on Mar. 9, 2020, now Pat. No. 11,196,708, which is a
(Continued)

(51) Int. Cl.
*H04L 65/1104* (2022.01)
*H04L 67/14* (2022.01)
(Continued)

(52) U.S. Cl.
CPC ...... *H04L 65/1104* (2022.05); *H04L 41/0846* (2013.01); *H04L 65/1069* (2013.01);
(Continued)

(58) Field of Classification Search
None
See application file for complete search history.

(56) References Cited

U.S. PATENT DOCUMENTS

| | | | |
|---|---|---|---|
| 5,930,701 A | 7/1999 | Skog | |
| 5,956,633 A | 9/1999 | Janhila | |

(Continued)

FOREIGN PATENT DOCUMENTS

| | | |
|---|---|---|
| WO | 1995/32463 | 11/1995 |
| WO | 2002/08852 | 1/2002 |

(Continued)

OTHER PUBLICATIONS

Advisory Action issued in U.S. Appl. No. 11/158,955 dated Nov. 30, 2011, 3 pages.
(Continued)

*Primary Examiner* — Otis L Thompson, Jr.
(74) *Attorney, Agent, or Firm* — Fish & Richardson P.C.

(57) ABSTRACT

According to one aspect, a system and method of exchanging GRUUs (Globally Routed User Agent URI (Uniform Resource Identifier)) between a first telephony-enabled device and a second telephony enabled device using a circuit-switched message is provided. Once exchanged, the telephony enabled devices can exchange SIP (session initiated protocol) communications routed by the GRUUs. Any one of the telephony-enabled devices can add a media component to the SIP communications. According to another aspect, a system and method of generating GRUUs is provided. According to another aspect, a system and method of handing off communications to a packet switched network from a circuit switched network is provided.

20 Claims, 13 Drawing Sheets

Related U.S. Application Data continuation of application No. 16/296,879, filed on Mar. 8, 2019, now Pat. No. 10,587,573, which is a continuation of application No. 15/589,612, filed on May 8, 2017, now Pat. No. 10,243,921, which is a continuation of application No. 15/218,874, filed on Jul. 25, 2016, now Pat. No. 9,681,000, which is a continuation of application No. 14/968,527, filed on Dec. 14, 2015, now Pat. No. 9,426,301, which is a continuation of application No. 14/699,589, filed on Apr. 29, 2015, now Pat. No. 9,215,143, which is a continuation of application No. 13/758,358, filed on Feb. 4, 2013, now Pat. No. 9,049,121, which is a continuation of application No. 11/158,955, filed on Jun. 22, 2005, now Pat. No. 8,401,002.

(51) Int. Cl.

| | |
|---|---|
| H04L 41/084 | (2022.01) |
| H04M 7/00 | (2006.01) |
| H04W 4/12 | (2009.01) |
| H04L 65/1069 | (2022.01) |
| H04L 65/1073 | (2022.01) |
| H04L 101/39 | (2022.01) |

(52) U.S. Cl.
CPC .......... *H04L 65/1073* (2013.01); *H04L 67/14* (2013.01); *H04M 7/006* (2013.01); *H04M 7/0048* (2013.01); *H04M 7/0075* (2013.01); *H04W 4/12* (2013.01); *H04L 2101/39* (2022.05)

(56) References Cited

U.S. PATENT DOCUMENTS

| | | |
|---|---|---|
| 6,266,525 B1 | 7/2001 | Peterson |
| 6,721,871 B2 | 4/2004 | Piispanen et al. |
| 6,819,670 B1 | 11/2004 | Fenner |
| 6,996,087 B2 | 2/2006 | Ejzak |
| 7,412,044 B2 * | 8/2008 | Chavez ............. H04M 3/42382 709/200 |
| 7,448,080 B2 | 11/2008 | Karjala et al. |
| 7,809,843 B1 | 10/2010 | Denninghoff |
| 8,401,002 B2 | 3/2013 | Allen et al. |
| 9,049,121 B2 | 6/2015 | Allen et al. |
| 9,215,143 B2 | 12/2015 | Allen et al. |
| 9,426,301 B2 | 8/2016 | Allen et al. |
| 9,681,000 B2 | 6/2017 | Allen et al. |
| 10,243,921 B2 | 3/2019 | Allen et al. |
| 10,587,573 B2 | 3/2020 | Allen et al. |
| 2002/0198976 A1 | 12/2002 | Davenport |
| 2003/0013467 A1 | 1/2003 | Caloud |
| 2003/0120940 A1 | 6/2003 | Vataja |
| 2004/0122931 A1 | 6/2004 | Rowland et al. |
| 2004/0239498 A1 | 12/2004 | Miller |
| 2004/0268148 A1 | 12/2004 | Katjala et al. |
| 2005/0058096 A1 | 3/2005 | Cheng |
| 2005/0111494 A1 | 5/2005 | Kecskemeti |
| 2005/0130654 A1 | 6/2005 | Diclaudio et al. |
| 2005/0174987 A1 * | 8/2005 | Raghav ............... H04L 65/1069 370/351 |
| 2005/0232225 A1 | 10/2005 | Pelaez et al. |
| 2006/0018272 A1 | 1/2006 | Mutikaninen et al. |
| 2006/0116105 A1 | 6/2006 | Frankel et al. |
| 2006/0126594 A1 | 6/2006 | Tu |
| 2006/0235981 A1 | 10/2006 | Westman et al. |
| 2007/0274306 A1 | 11/2007 | Kouchri et al. |
| 2008/0102801 A1 | 5/2008 | Lazaridis et al. |
| 2008/0263212 A1 | 10/2008 | Goix et al. |
| 2009/0092093 A1 * | 4/2009 | Wu .................... H04L 65/1095 370/331 |
| 2018/0042055 A1 | 2/2018 | Bakker et al. |
| 2018/0184277 A1 | 6/2018 | Suzuki et al. |
| 2019/0268301 A1 | 8/2019 | Allen et al. |
| 2020/0213275 A1 | 7/2020 | Allen et al. |

FOREIGN PATENT DOCUMENTS

| | | |
|---|---|---|
| WO | 2003/081887 | 10/2003 |
| WO | 2004/049739 | 6/2004 |
| WO | 2005/036916 | 4/2005 |
| WO | 3012574 | 2/2013 |

OTHER PUBLICATIONS

Communication Pursuant to Article 96(2) EPC issued in European Application No. 05107717.0 dated Nov. 27, 2006, 5 pages.

Extended European Search Report issued in European Application No. 05107717.0 dated Nov. 23, 2005, 7 pages.

Final Office Action issued in U.S. Appl. No. 11/158,955 dated Aug. 18, 2011, 11 pages.

Final Office Action issued in U.S. Appl. No. 11/158,955 dated Aug. 20, 2012, 12 pages.

Final Office Action issued in U.S. Appl. No. 11/158,955 dated Oct. 27, 2009, 9 pages.

Initiation Protocol (SIP), The Internet Society, Feb. 21, 2005, 33 pages.

Leach et al., "A UUID URN Namespace", IETF, Dec. 2004, 22 pages.

Non-Final Office Action issued in U.S. Appl. No. 11/158,955 dated Feb. 23, 2009, 13 pages.

Non-Final Office Action issued in U.S. Appl. No. 11/158,955 dated Feb. 3, 2010, 9 pages.

Non-Final Office Action issued in U.S. Appl. No. 11/158,955 dated Jan. 6, 2011, 10 pages.

Non-Final Office Action issued in U.S. Appl. No. 11/158,955 dated Jun. 30, 2010, 9 pages.

Non-Final Office Action issued in U.S. Appl. No. 15/218,874 dated Nov. 18, 2016, 8 pages.

Non-Final Office Action issued in U.S. Appl. No. 15/589,612 dated Jul. 10, 2018, 10 pages.

Non-Final Office Action issued in U.S. Appl. No. 16/296,879 dated Aug. 12, 2019, 12 pages.

Notice of Allowance issued in U.S. Appl. No. 11/158,955 dated Nov. 6, 2012, 9 pages.

Notice of Allowance issued in U.S. Appl. No. 13/758,358 dated Jan. 27, 2015, 10 pages.

Notice of Allowance issued in U.S. Appl. No. 14/699,589 dated Aug. 11, 2015, 10 pages.

Notice of Allowance issued in U.S. Appl. No. 14/968,527 dated Apr. 22, 2016, 13 pages.

Notice of Allowance issued in U.S. Appl. No. 15/218,874 dated Feb. 9, 2017, 8 pages.

Notice of Allowance issued in U.S. Appl. No. 15/589,612 dated Nov. 9, 2018, 7 pages.

Notice of Allowance issued in U.S. Appl. No. 16/296,879 dated Oct. 30, 2019, 7 pages.

Notice of Allowance issued in U.S. Appl. No. 16/813,473 dated Aug. 4, 2021, 14 pages.

Office Action issued in Canadian Application No. 2,612,855, dated Apr. 14, 2014, 4 pages.

PCT International Preliminary Report on Patentability in International Application No. PCT/CA2006001043, dated Jul. 4, 2007, 13 pages.

PCT International Preliminary Report on Patentability in International Application No. PCT/CA2006001044, dated Dec. 24, 2007, 13 pages.

PCT International Search Report and Written Opinion in International Application No. PCT/CA2006001043, dated Nov. 6, 2006, 12 pages.

PCT International Search Report and Written Opinion in International Application No. PCT/CA2006001044, dated Oct. 31, 2006, 8 pages.

(56) References Cited

OTHER PUBLICATIONS

Rosenberg, "Obtaining and Using Globally Routable User Agent (UA) URIs (GRUU) in the Session Initiation Protocol (SIP)" Internet Draft, draft-ietf-sip-gruu-10, 8 pages.

* cited by examiner

EXCHANGE AND USE OF GLOBALLY UNIQUE DEVICE IDENTIFIERS FOR CIRCUIT-SWITCHED AND PACKET SWITCHED INTEGRATION

This application is a continuation of U.S. patent application Ser. No. 16/813,473 filed on Mar. 9, 2020, which is a continuation of U.S. patent application Ser. No. 16/296,879 filed on Mar. 8, 2019, which is a continuation of U.S. patent application Ser. No. 15/589,612 filed on May 8, 2017, and issued as U.S. Pat. No. 10,243,921 on Mar. 26, 2019, which is a continuation of U.S. patent application Ser. No. 15/218,874 filed on Jul. 25, 2016, and issued as U.S. Pat. No. 9,681,000 on Jun. 13, 2017, which is a continuation of U.S. patent application Ser. No. 14/968,527 filed on Dec. 14, 2015, and issued as U.S. Pat. No. 9,426,301 on Aug. 23, 2016, which is a continuation of U.S. patent application Ser. No. 14/699,589 filed on Apr. 29, 2015, and issued as U.S. Pat. No. 9,215,143 on Dec. 15, 2015, which is a continuation of U.S. patent application Ser. No. 13/758,358 filed on Feb. 4, 2013, and issued as U.S. Pat. No. 9,049,121 on Jun. 2, 2015, which is a continuation of U.S. patent application Ser. No. 11/158,955, filed on Jun. 22, 2005, and issued as U.S. Pat. No. 8,401,002 on Mar. 19, 2013, the entire contents of both are hereby incorporated by reference.

FIELD OF THE APPLICATION

The application relates to telephony-enabled devices, and more particularly to globally unique device identifiers.

BACKGROUND

A mobile terminal may support voice and data communications using circuit switched networks and/or SIP (Session Initiation Protocol) networks. In some instances, it may be necessary to transfer all media or a media component of the communication between the circuit switched network and the SIP network. In other instances, it may be necessary to add media components using one network technology to an existing communication using another network technology. These particular instances may be a result of the nature of the communication, the access technology being used, and the QoS (Quality of Service) requirements of the communication.

A GRUU (Globally Routed User Agent URI (Uniform Resource Identifier)) is used to uniquely identify a terminal instance involved in a communication. The GRUU is a SIP (Session Initiated Protocol) URI currently being defined within the IETF (Internet Engineering Task Force) [J. Rosenberg, Obtaining and Using Globally Routable User Agent (UA) URIs (GRUU) in the Session Initiation Protocol (SIP), Internet Engineering Task Force, Feb. 21, 2005, expires on Aug. 22, 2005] (hereinafter referred to as "Rosenberg" and hereby incorporated by reference in its entirety) for the purpose of uniquely identifying a single SIP device or user agent instance where multiple SIP devices may share the same public user identity or AOR (address of record). A SIP User Agent indicates that it supports the GRUU when it registers with the SIP Registrar and also provides a unique instance identifier that uniquely identifies the SIP User Agent. The SIP Registrar then generates a GRUU based on the unique instance identifier and the registered AOR and provides it to the SIP User Agent in a "SIP 200 OK" response to the SIP register request. The GRUU can then be used as a SIP URI to communicate with just that particular SIP User Agent even though multiple SIP User Agents may be registered against the same public AOR.

BRIEF DESCRIPTION OF THE DRAWINGS

Embodiments will now be described with reference to the attached drawings in which.

DETAILED DESCRIPTION OF THE EMBODIMENTS

Figure 1:
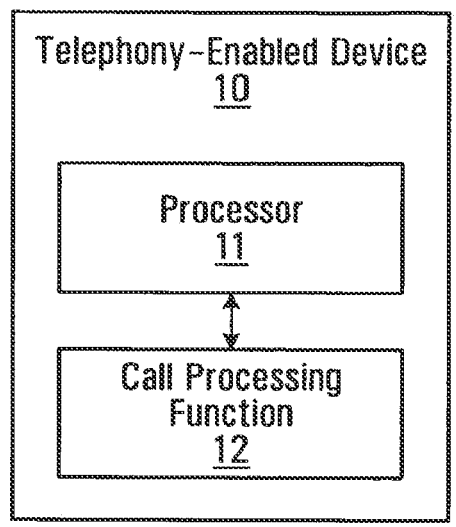
FIG. 1 is a block diagram of an example telephony-enabled device adapted to exchange GRUUs with another telephony-enabled device.

According to a broad aspect, there is provided a method in a first telephony-enabled device of enabling packet switched communications with a second telephony-enabled device, the method comprising: obtaining a first GUDI (globally unique device identifier); and sending the first GUDI to the second telephony-enabled device via a first circuit switched message; wherein if a second GUDI is received from the second telephony-enabled device, then packet-switched data is routable to the second telephony-enabled device using the second GUDI and packet-switched data is routable to the first telephony-enabled device using the first GUDI.

According to another broad aspect, there is provided a telephony-enabled device comprising a call processing function for enabling packet switched communications with another telephony-enabled device by executing steps comprising: obtaining a first GUDI (globally unique device identifier); and sending the first GUDI to the another telephony-enabled device via a first circuit switched message; wherein if a second GUDI is received from the another telephony-enabled device, then packet-switched data is routable to the another telephony-enabled device using the second GUDI and packet-switched data is routable to the telephony-enabled device using the first GUDI.

According to another broad aspect, there is provided a computer readable medium having computer executable instructions stored thereon for execution on a telephony-enabled device so as to enable packet switched communications with another telephony-enabled device by implementing steps comprising: obtaining a first GUDI (globally unique device identifier); and sending the first GUDI to the another telephony-enabled device via a first circuit switched message; wherein if a second GUDI is received from the second telephony-enabled device, then packet-switched data is routable to the another telephony-enabled device using the second GUDI and packet-switched data is routable to the telephony-enabled device using the first GUDI.

According to another broad aspect, there is provided a wireless device comprising a call processing function for enabling packet switched communications with a second telephony-enabled device by executing steps comprising: obtaining a first GUDI (globally unique device identifier); and sending the first GUDI to the second telephony-enabled device via a first circuit switched message; wherein if a second GUDI is received from the second telephony-enabled device, then packet-switched data is routable to the second telephony-enabled device using the second GUDI and packet-switched data is routable to the wireless device using the first GUDI.

According to another broad aspect, there is provided a computer readable medium having computer executable instructions stored thereon for execution on a wireless device so as to enable packet switched communications with a second telephony-enabled device by implementing steps comprising: obtaining a first GUDI (globally unique device identifier); and sending the first GUDI to the second telephony-enabled device via a first circuit switched message; wherein if a second GUDI is received from the second telephony-enabled device, then packet-switched data is routable to the second telephony-enabled device using the second GUDI and packet-switched data is routable to the wireless device using the first GUDI.

According to another broad aspect, there is provided a method of generating a GUDI (globally unique device identifier) for a telephony-enabled device, the method comprising: generating a GUDI using at least one of the telephony-enabled device's unique ID and a user's unique ID.

In some embodiments, the telephony-enabled device's unique ID is an IMEI (International mobile equipment identity) of the telephony-enabled device; and the user's unique ID is an IMSI (International mobile subscription identifier) of the telephony-enabled device.

In some embodiments, at least one of the telephony-enabled device's unique ID and the user's unique ID are used to directly generate the GUDI.

In some embodiments, the method further comprises: generating an instance ID (identifier) from at least one of the telephony-enabled device's unique ID and the user's unique ID; generating the GUDI from the instance ID and an AOR (address of record) of the telephony-enabled device.

According to another broad aspect, there is provided a packet switched network element comprising a call processing function for generating a GUDI (globally unique device identifier) for a telephony-enabled device using the telephony-enabled device's unique ID and a user's unique ID.

According to another broad aspect, there is provided a computer readable medium having computer executable instructions stored thereon for execution on a packet switched network element so as to generate a GUDI (globally unique device identifier) for a telephony-enabled device using the telephony-enabled device's unique ID and a user's unique ID.

According to another broad aspect, there is provided a wireless device comprising a GUDI generation function for generating a GUDI (globally unique device identifier) for the wireless device by using the wireless device's unique ID and a user's unique ID.

According to another broad aspect, there is provided a computer readable medium having computer executable instructions stored thereon for execution on a wireless device so as to generate a GUDI (globally unique device identifier) for the wireless device by using the wireless device's unique ID and a user's unique ID.

According to another broad aspect, there is provided a method in a wireless device of handing off communication from a wireless circuit switched network to a wireless packet switched network, the method comprising: at some time during a circuit switched call with a second telephony-enabled device, the circuit switched call initially being via the wireless circuit switched network: obtaining a GUDI (globally unique device identifier) for the wireless device, the GUDI enabling packet-switched data to be globally routed to the wireless device via the wireless packet switched network; and handing off the communication to the wireless packet switched network, the communication over the wireless packet switched network being via packet-switched communication.

In some embodiments, the packet switched communication is VoIP (voice over Internet Protocol) communication.

In some embodiments, the GUDI is reduced in size by at least one transformation selected from a group of transformations consisting of compression, and truncation.

According to another broad aspect, there is provided a wireless device comprising a call processing function for handing off communication from a wireless circuit switched network to a wireless packet switched network by implementing steps comprising: at some time during a circuit switched call with a second telephony-enabled device, the circuit switched call initially being via the wireless circuit switched network: obtaining a GUDI (globally unique device identifier) for the wireless device, the GUDI enabling packet-switched data to be globally routed to the wireless device via the wireless packet switched network; and handing off the communication to the wireless packet switched network, the communication over the wireless packet switched network being via packet-switched communication.

According to another broad aspect, there is provided a computer readable medium having computer executable instructions stored thereon for execution on a wireless device so as to hand off communication from a wireless circuit switched network to a wireless packet switched network by implementing steps comprising: at some time during a circuit switched call with a second telephony-enabled device, the circuit switched call initially being via the wireless circuit switched network: obtaining a GUDI (globally unique device identifier) for the wireless device, the GUDI enabling packet-switched data to be globally routed to the wireless device via the wireless packet switched network; and handing off the communication to the wireless packet switched network, the communication over the wireless packet switched network being via packet-switched communication.

According to another broad aspect, there is provided a method in a wireless network element of handing off communications from a wireless circuit switched network to a wireless packet switched network, the method comprising: at some time during a circuit switched call between a wireless device and a second telephony-enabled device, the circuit switched call initially being via the wireless circuit switched network: obtaining a GUDI (globally unique device identifier) for the wireless device, the GUDI enabling packet-switched data to be globally routed to the wireless device via the wireless packet switched network; handing off the wireless access communication to the wireless packet switched network, the communication over the wireless packet switched network being via packet-switched communication.

In some embodiments handing off communication from the first circuit switched network to the packet switched network comprises: receiving a request for packet switched communications from the telephony enabled device, and associated with the request receiving the GUDI from the telephony enabled device; establishing the packet switched communication between the gateway and the telephony-enabled device over the packet switched network; the gateway performing media conversion on the packet switched communication, and transmitting the converted media over the circuit switched port associated with the received GUDI.

In some embodiments, the gateway uses the GUDI to provide a mapping for the packet switched communications of the telephony-enabled device to the circuit switched port.

In some embodiments, the packet switched communication is VoIP (voice over Internet Protocol) communication.

In some embodiments, the GUDI is reduced in size by at least one transformation selected from a group of transformations consisting of compression, and truncation.

According to another broad aspect, there is provided a wireless network element comprising a call processing function for handing off communications from a wireless circuit switched network to a wireless packet switched network by implementing steps comprising: at some time during a circuit switched call between a wireless device and a second telephony-enabled device, the circuit switched call initially being via the wireless circuit switched network: obtaining a GUDI (globally unique device identifier) for the wireless device, the GUDI enabling packet-switched data to be globally routed to the wireless device via the wireless packet switched network; handing off the wireless access communication to the wireless packet switched network, the communication over the wireless packet switched network being via packet-switched communication.

According to another broad aspect, there is provided a computer readable medium having computer executable instructions stored thereon for execution on a wireless network element so as to hand off communications from a wireless circuit switched network to a wireless packet switched network by implementing steps comprising: at some time during a circuit switched call between a wireless device and another telephony-enabled device, the circuit switched call initially being via the wireless circuit switched network: obtaining a GUDI (globally unique device identifier) for the wireless device, the GUDI enabling packet-switched data to be globally routed to the wireless device via the wireless packet switched network; handing off the wireless access communication to the wireless packet switched network, the communication over the wireless packet switched network being via packet-switched communication.

According to another broad aspect, there is provided a method in a gateway of handing off communications from a first circuit switched network to a packet switched network, the method comprising: at some time during a circuit switched call routed between a telephony-enabled device and a second circuit switched network via the first circuit switched network, the gateway, and a circuit switched port to the second circuit switched network: obtaining a GUDI (globally unique device identifier) for the circuit switched port; communicating the GUDI to the telephony-enabled device, the GUDI enabling packet-switched communication to be globally routed from the telephony-enabled device to the circuit switched port via the packet switched network; and handing off communication from the first circuit switched network to the packet switched network.

In some embodiments, the second circuit switched network is a PSTN (publicly switched telephone network).

In some embodiments, the packet switched communication is VoIP (voice over Internet Protocol) communication.

According to another broad aspect, there is provided a gateway comprising a gateway control function for handing off communications from a first circuit switched network to a packet switched network by implementing steps comprising: at some time during a circuit switched call routed between a telephony-enabled device and a second circuit switched network via the first circuit switched network, the gateway, and a circuit switched port to the second circuit switched network: obtaining a GUDI (globally unique device identifier) for the circuit switched port; communicating the GUDI to the telephony-enabled device, the GUDI enabling packet-switched communication to be globally routed from the telephony-enabled device to the circuit switched port via the packet switched network; and handing off communication from the first circuit switched network to the packet switched network.

According to another broad aspect, there is provided A computer readable medium having computer executable instructions stored thereon for execution on a gateway so as to hand off communications from a first circuit switched network to a packet switched network by implementing steps comprising: at some time during a circuit switched call routed between a telephony-enabled device and a second circuit switched network via the first circuit switched network, the gateway, and a circuit switched port to the second circuit switched network:
obtaining a GUDI (globally unique device identifier) for the circuit switched port; communicating the GUDI to the telephony-enabled device, the GUDI enabling packet-switched communication to be globally routed from the telephony-enabled device to the circuit switched port via the packet switched network; and handing off communication from the first circuit switched network to the packet switched network.

Circuit switched networks address terminals using E.164 telephone numbers while SIP networks address terminals using URLs (either SIP URLs or E.164 telephone number URLs). In both network types, the same E.164 telephone number or URL may address multiple terminals. Therefore, in order to add or transfer a media component using a different network architecture, it is necessary to identify and address the same terminal instance as involved in the existing communication and exchange these identities between the participating parties.

Although each terminal will likely have an IP address for IP datagram communications, this IP Address may not be globally routable between two mobile terminals and also the SIP network may require that SIP signaling messages route via certain SIP proxies. Therefore the exchange and use of the terminals' IP Addresses is not a general solution. Accordingly, in order to achieve circuit-switched and packet-switched integration, there is a need to provide a system and method for exchanging GRUUs between two terminals to reach the same device for packet-switched communications as is being used for circuit-switched communications.

Telephony-Enabled Devices

Referring now to FIG. 1, shown is a block diagram of an example telephony-enabled device 10 adapted to communicate using circuit switched and packet switched communications separately or simultaneously, and exchange GRUUs with another telephony-enabled device. The telephony-enabled device may for example be a wireless device, or a wireline device. The telephony-enabled device 10 has a processor 11 coupled to a call processing function 12.

In some embodiments, the GRUU that is exchanged is identical to the GRUU defined in Rosenberg. In other embodiments, a different definition of the GRUU is contemplated. More generally, any GUDI (globally unique device identifier) appropriate for use in packet switched communications such as IP (Internet protocol) may be employed with implementation-specific modifications, as may be appropriate. In the examples that follow, it is to be understood that references to GRUUs made throughout may refer to GRUUs as defined in Rosenberg, or any other appropriate definition.

In operation, the telephony-enabled device 10 is adapted to communicate using circuit switched and packet switched communications separately or simultaneously. Circuit switched communication may include, for example, a voice call. Packet switched communication may include any data, for example, streaming video data or VoIP (Voice over IP). According to one aspect, the call processing function 12 operates to provide the telephony-enabled device 10 with functionality of exchanging GRUUs with another telephony-enabled device using circuit switched messages. Details of how this may be accomplished are discussed later with reference to FIG. 8. In some embodiments, the call processing function 12 is software implemented and may be executed by the processor 11. However, more generally, the call processing function 12 may be implemented as software, hardware, firmware, or as any appropriate combination of software, hardware and firmware.

Figure 2:
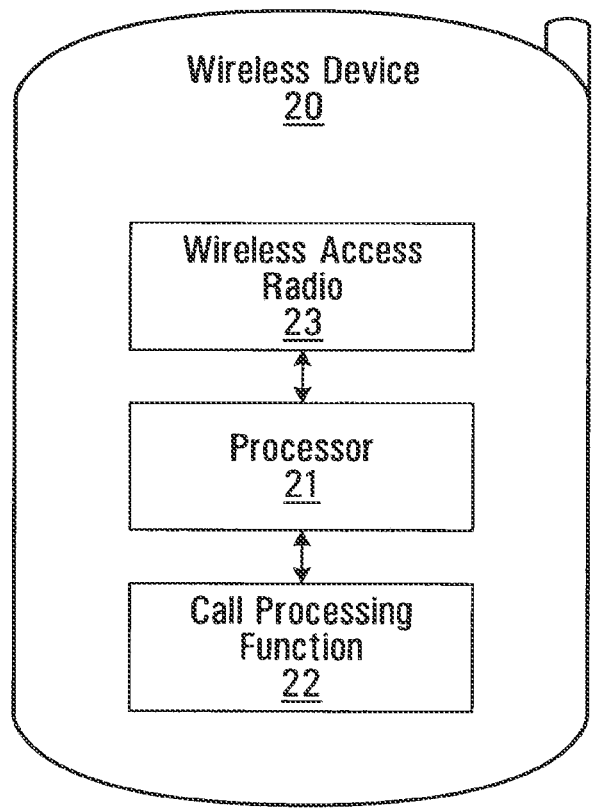
FIG. 2 is a block diagram of an example wireless device adapted to exchange GRUUs with another telephony-enabled device.

Referring now to FIG. 2, shown is a block diagram of an example wireless device 20 adapted to communicate using circuit switched and packet switched communications separately or simultaneously, and exchange GRUUs with another telephony-enabled device. The wireless device 20 has a processor 21 coupled to a wireless access radio 23 and a call processing function 22.

In operation, the wireless device 20 is adapted to communicate wirelessly over a wireless communication network, for example a cellular network (not shown), using the wireless access radio 23. The wireless device 20 is adapted to communicate using circuit switched and packet switched communications separately or simultaneously. Circuit switched communication may include, for example, a voice call. Packet switched communication may include any data, for example, streaming video data. According to one aspect, the call processing function 22 operates to provide the wireless device 20 with functionality of exchanging GRUUs with another telephony-enabled device using circuit switched messages. Details of how this may be accomplished are discussed later with reference to FIG. 8. In some embodiments, the call processing function 22 is software implemented and may be executed by the processor 21. However, more generally, the call processing function 22 may be implemented as software, hardware, firmware, or as any appropriate combination of software, hardware and firmware.

The devices of FIGS. 1 and 2 show only functionality relevant to the aspects described herein. It is to be understood that practical implementations would include additional functionality to that shown.

Telephony-Enabled Network

Figure 3:
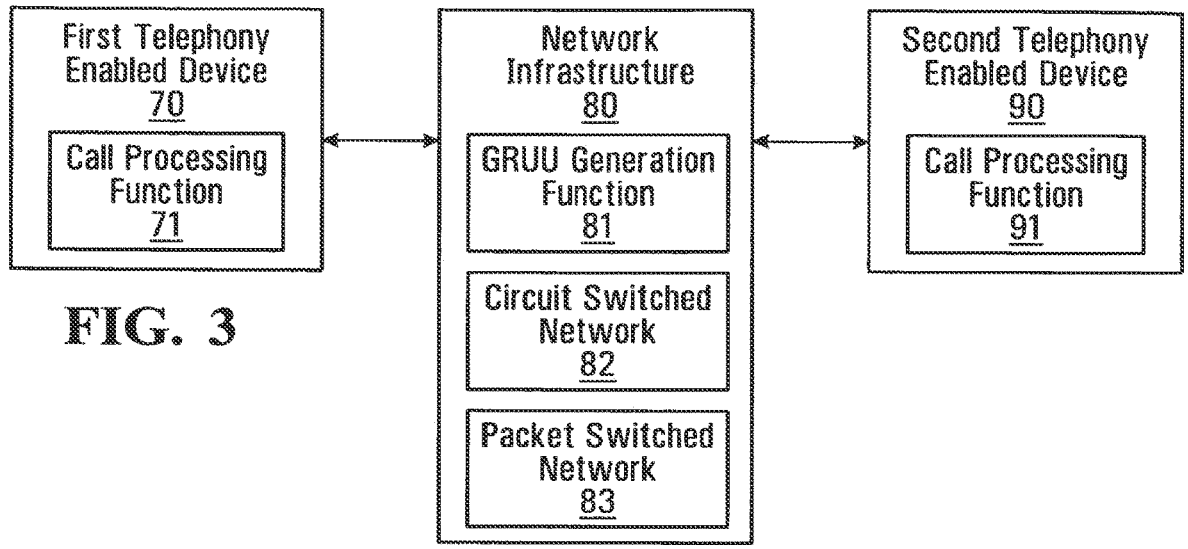
FIG. 3 is a block diagram of an example telephony network in which GRUUs are generated by a network infrastructure.

Referring now to FIG. 3, shown is a block diagram of an example telephony network in which GRUUs are generated by a network infrastructure 80. The network infrastructure 80 is coupled to a first telephony-enabled device 70 and a second telephony-enabled device 90. The first telephony-enabled device 70 has a call processing function 71. The network infrastructure 80 has a GRUU generation function 81, a circuit switched network 82, and a packet switched network 83. In some embodiments, the GRUU generation function 81 is implemented in a SIP server (not shown) residing within the network infrastructure 80. The second telephony-enabled device 90 has a call processing function 91.

The circuit switched network 82 and the packet switched network 83 provide infrastructure for allowing the two telephony enabled devices 70,90 to communicate using circuit switched communications and packet switched communications simultaneously or separately. The nature of this infrastructure will depend partly on the nature of the two devices 70,90. If one or both of the devices are wireless devices, then the infrastructure will include wireless access infrastructure. Furthermore, the infrastructure may include wireless and/or wireline PSTN (public switched telephone network) equipment and private or public packet network infrastructure.

While only two telephony enabled devices are shown, the network infrastructure would support multiple such devices. The connections between the devices and the infrastructure may be permanent or dynamic in nature.

In operation, the first telephony-enabled device 70 and the second telephony-enabled device 90 are adapted to communicate with one another using circuit switched communications over the circuit switched network 82 and packet switched communications over the packet switched network 83. The call processing function 71 and the call processing function 91 each operate to provide the first telephony-enabled device 70 and the second telephony-enabled device 90, respectively, with functionality of exchanging GRUUs with one another using circuit switched messages. Details of how this may be accomplished are discussed later with reference to FIG. 8. The GRUU generation function 81 is adapted to generate a GRUU for a given telephony-enabled device from two or more variables of the telephony-enabled device in such a manner that each GRUU is unique.

In some embodiments, the two or more variables of the telephony-enabled device include an instance ID (identifier) and an AOR (address of record). The GRUU as defined by Rosenberg utilises these two variables. The instance ID is an identifier that uniquely identifies a SIP user agent amongst all other user agents associated with an AOR. The instance ID is represented by a URI that is a valid URN (uniform resource name). In some embodiments, the GRUU generation function 81 is implemented in a packet switched communications server or a SIP server (not shown) residing within the network infrastructure 80.

Figure 4:
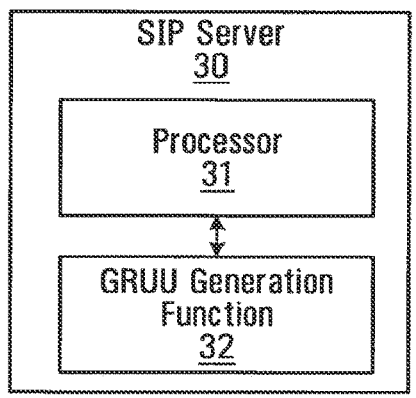
FIG. 4 is a block diagram of an example SIP server adapted to generate GRUUs.

Referring now to FIG. 4, shown is a block diagram of an example SIP server 30 adapted to generate GRUUs. The SIP server 30 has a processor 31 coupled to a GRUU generation function 32. The GRUU generation function 32 is adapted to generate a GRUU. A telephony-enabled device provides variables, for example an instance ID (identifier) and an AOR, to the SIP server in a SIP REGISTER request message. The SIP server registers the telephony-enabled device and uses the variables to generate the GRUU. In some embodiments, the GRUU is generated using concatenation of the variables. In other embodiments, the GRUU is generated using a mathematical function of the variables. In further embodiments, the mathematical function is not publicly known for security reasons. In some embodiments, the mathematical function has another input for an encryption key. Once generated, the SIP server provides the GRUU to the first telephony-enabled device in a "SIP 200 OK" response message. In some embodiments, the GRUU generation function 32 is software implemented and may be executed by the processor 31. However, more generally, the GRUU generation function 32 may be implemented as software, hardware, firmware, or as any appropriate combination of software, hardware and firmware.

Figure 5:
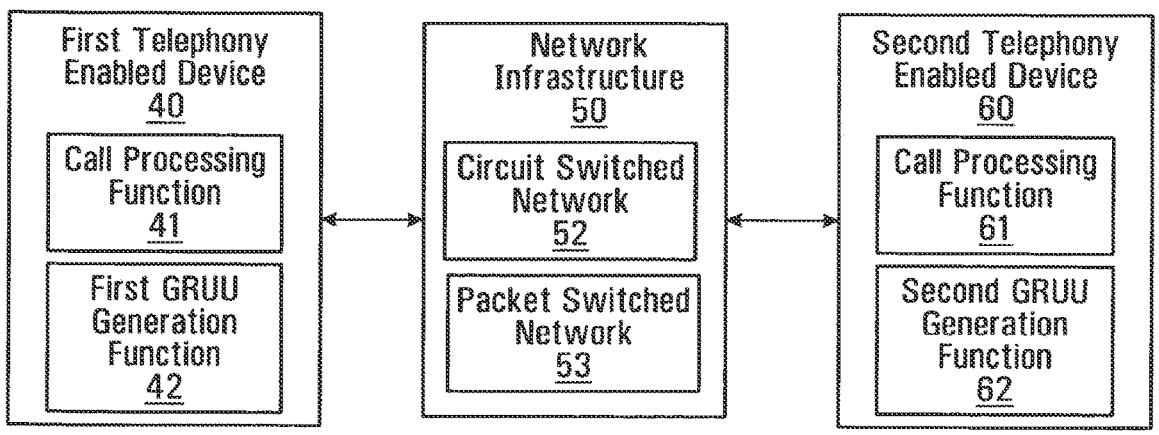
FIG. 5 is a block diagram of an example telephony network in which GRUUs are generated locally by the telephony-enabled devices.

Referring now to FIG. 5, shown is a block diagram of an example telephony network in which GRUUs are generated locally by the telephony-enabled devices. The telephony network has a network infrastructure 50 coupled to a first telephony-enabled device 40 and a second telephony-enabled device 60. The first telephony-enabled device 40 has a call processing function 41 and a GRUU generation function 42. The second telephony-enabled device 60 has a call processing function 61 and a second GRUU generation function 62. The network infrastructure 50 has a circuit switched network 52 and a packet switched network 53.

In operation, the components in FIG. 5 function much like the components in FIG. 3 with exception to the generation of GRUUs. In the telephony network of FIG. 3, GRUU generation is implemented within the network infrastructure. However, in the telephony network of FIG. 5, GRUU generation is implemented locally within the telephony-enabled devices. In the illustrated example, GRUU generation is implemented by GRUU generation functions 42,62, but more generally this can be done by any function within the devices. Upon generating a GRUU, each of the telephony-enabled devices 40, 60 informs the network infrastructure 50 of its respective GRUU, and the network infrastructure can subsequently route messages using the GRUUs.

GRUU Generation

There are many ways of generating a GRUU and there are many variables that can be used to generate a GRUU.

Figure 6:
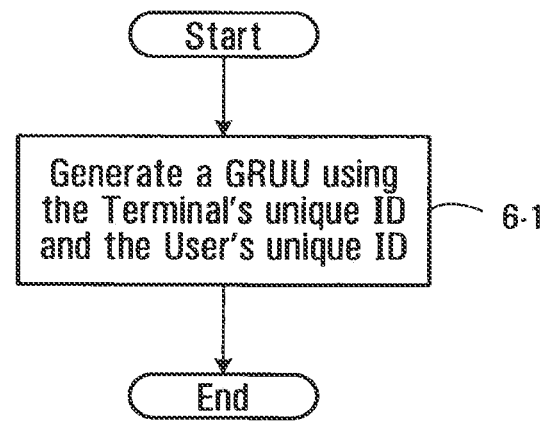
FIG. 6 is a flowchart of an example method of generating a GRUU.

In some embodiments, the GRUU is generated using the terminal's unique ID and the user's unique ID. Referring now to FIG. 6, shown is a flowchart of an example method of generating a GRUU. This method may be implemented by a network infrastructure, for example by the GRUU generation function 81 of the network infrastructure 80 of FIG. 3 or by the GRUU generation function 32 of the SIP server 30 of FIG. 4. More generally, this method may be implemented in any appropriate packet switched element (not shown) with a call processing function within the network infrastructure 80 of FIG. 3. This method may also be implemented locally within a telephony-enabled device, for example by the call processing function 41 of the first telephony-enabled device 40 of FIG. 5 and by the call processing function 61 of the second telephony-enabled device 60 of FIG. 5. At step 6-1, the GRUU is generated using the terminal's unique ID and the user's unique ID.

The nature of the terminal's unique ID and the user's unique ID are dependant upon the system. In the case of a GSM system, this might for example be an IMEI (International mobile equipment identity) of the telephony-enabled device and an IMSI (International mobile subscription identifier) of the user, respectively.

In the example provided, a GRUU is generated using both the terminal's unique ID and the user's unique ID. However, more generally, a GRUU may be generated using at least one of the terminal's unique ID and the user's unique ID, as both are not required for generating a GRUU.

Figure 7:
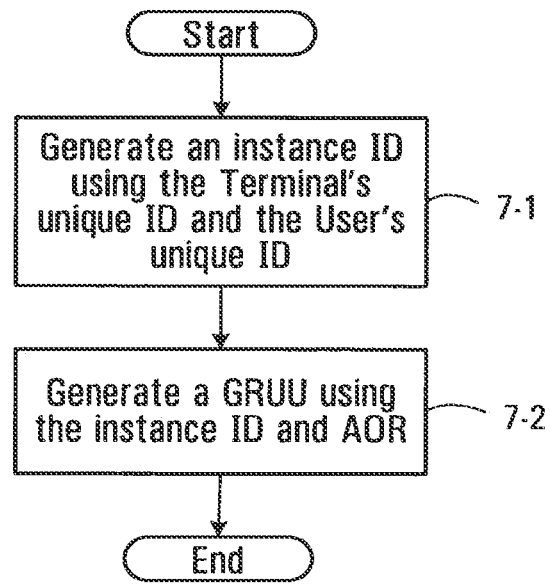
FIG. 7 is a flowchart of another example method of generating a GRUU.

In other embodiments, the GRUU is generated using the AOR and instance ID of the telephony-enabled device such that the instance ID is generated using the terminal's unique ID and the user's unique ID. Referring now to FIG. 7, shown is a flowchart of another example method of generating a GRUU. This method may be implemented by a network infrastructure, for example by the GRUU generation function 81 of the network infrastructure 80 of FIG. 3 or by the GRUU generation function 32 of the SIP server 30 of FIG. 4. This method may also be implemented locally within a telephony-enabled device, for example by the call processing function 41 of the first telephony-enabled device 40 of FIG. 5 and by the call processing function 61 of the second telephony-enabled device 60 of FIG. 5. At step 7-1, the terminal's unique ID and the user's unique ID are used to generate an instance ID, which is then used along with an AOR to generate a GRUU at step 7-2.

In the example provided, an instance ID is generated using both the terminal's unique ID and the user's unique ID. However, more generally, an instance ID may be generated using at least one of the terminal's unique ID and the user's unique ID, as both are not required for generating an instance ID.

The nature of the terminal's unique ID and the user's unique ID are dependant upon the system. In the case of a GSM system, this might for example be an IMEI (International mobile equipment identity) of the telephony-enabled device and an IMSI (International mobile subscription identifier) of the user, respectively.

An example of GRUU generation is presented here. The GRUU is generated from Public Identity (AOR), IMEI and IMSI. The GRUU generated may have the form sip: user.imei.subscriberID@ims.mnc.mcc.3gppnetwork.org. In some implementations, IMEI, MCC, MNC and SubscriberID are hexadecimal values. An example generated GRUU is as follows: sip: joeBloggs.0004589715336211.012987543807426@ims. mnc003.mcc23 4.3gppnetwork.orgIn some implementations, an instance ID is aligned with the URN definition found in [R. Moats, URN Syntax RFC 2141, Network Working Group, May 1997] (hereinafter reefed to as "Moats" and hereby incorporated by reference in its entirety). The instance ID follows the format of +sip.instance="urn:foo:1" in Moats.

GRUU Exchange and Use

Figure 8:
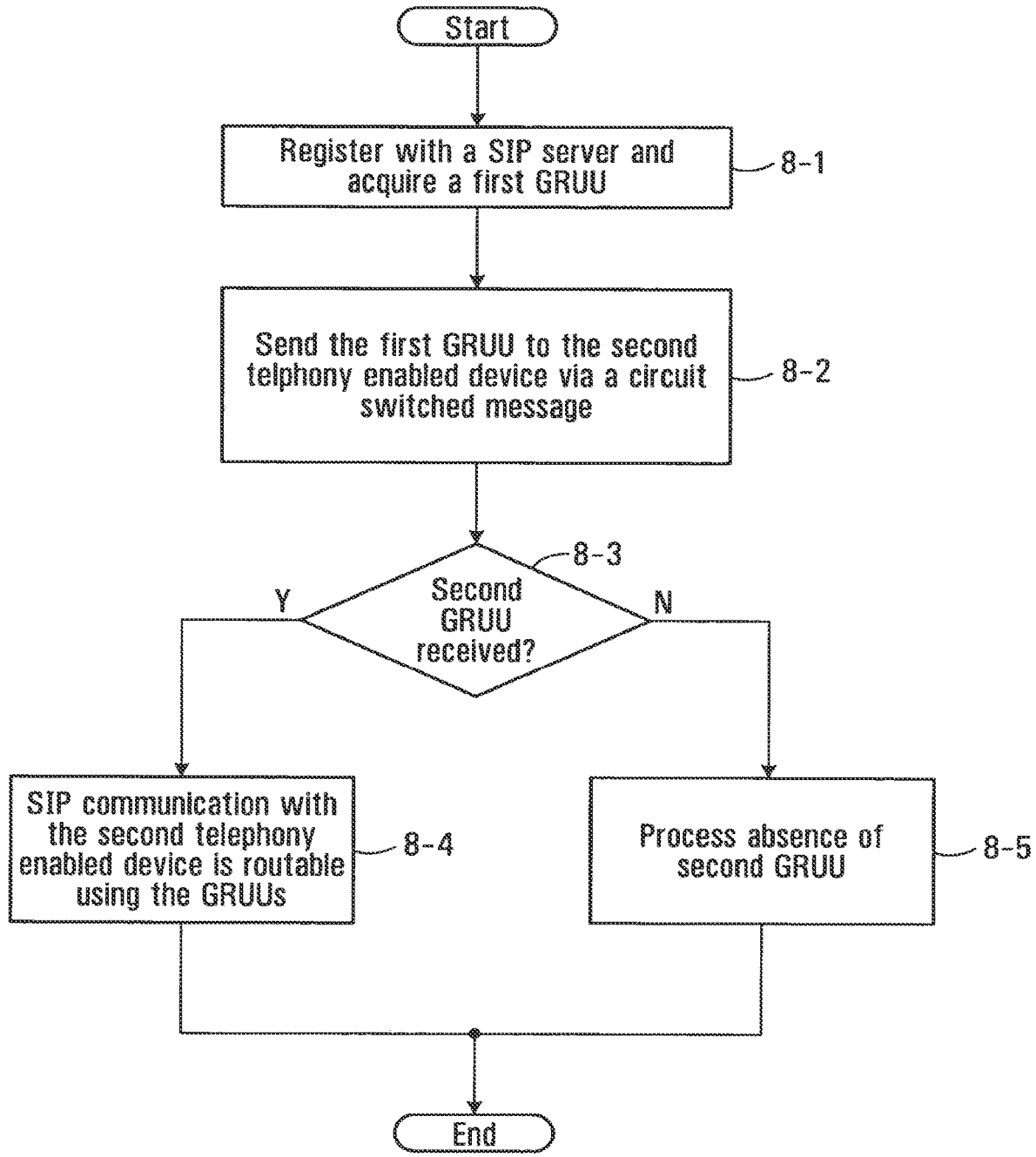
FIG. 8 is a flowchart of an example method of establishing SIP communication between a first telephony-enabled device and a second telephony-enabled device.

Referring now to FIG. 8, shown is a flowchart of an example method of establishing SIP communication between a first telephony-enabled device and a second telephony-enabled device. The method steps are executed by the first telephony-enabled device to try to exchange GRUUs. This method may be implemented in a telephony-enabled device, for example by the call processing function 12 of the telephony-enabled device 10 of FIG. 7 or by the call processing function 22 of the wireless device 20 of FIG. 8.

The first telephony-enabled device registers with a SIP server and acquires a first GRUU at step 8-1. The first telephony-enabled device sends the first GRUU to the second telephony-enabled device via a circuit switched message at step 8-2. If at step 8-3 the first telephony-enabled device receives a second GRUU from the second telephony-enabled device, then at step 8-4 SIP communication with the second telephony-enabled device is routable using the GRUUs. The second GRUU can be received in a packet switched message, for example a SIP message, or in a circuit switched message.

In some embodiments, if no second GRUU is received, an assumption is made by the first telephony-enabled device that the second telephony-enabled device is not capable of integrated SIP and Circuit Switched communications. In other embodiments, if the second GRUU is not received from the second telephony-enabled device, then the first telephony-enabled device processes the absence of the second GRUU, as shown at step 1-5. Various specific examples of such processing are given further below.

There are many ways in which the first GRUU can be acquired. In some embodiments, as described previously with reference to FIGS. 12 and 4, the first GRUU is generated by the SIP server and is provided to the first telephony-enabled device during the SIP registration procedure. In other embodiments, the first telephony-enabled device generates the first GRUU locally and informs the SIP server of the GRUU.

In some embodiments, the GRUUs are exchanged during an active circuit switched call. Advantageously, once the GRUUs have been exchanged during a circuit switched call, SIP messages may be exchanged. In other embodiments, the GRUUs are exchanged during the setup procedure of a circuit switched call. In further embodiments, the GRUUs are exchanged at some time before a circuit switched call is setup.

A "circuit switched message" is a term used throughout to include any message routed using E.164 telephone numbers, or any message traversing a physical path dedicated to a single connection between two end-points in a network for the duration of the connection. This definition does not include messages routed using a URI (universal resource identifier), even if the URI has been translated from an E.164 number. There are many kinds of "circuit switched messages" that can be used to send the first GRUU to the second telephony-enabled device. In some implementations, the first GRUU is sent via an ISUP (ISDN (integrated services digital network) user part) message. In other implementations, the first GRUU is sent via an SMS (short message service) message. In other implementations, the first GRUU is sent via a USSD (unstructured supplementary service data) message. In other implementations, the first GRUU is sent via a MMS (multimedia messaging service) message. In other implementations, the first GRUU is sent via a BICC (bearer independent call control) message. In further implementations, the first GRUU is sent via a plurality of circuit switched messages of varying kinds.

Figure 9:
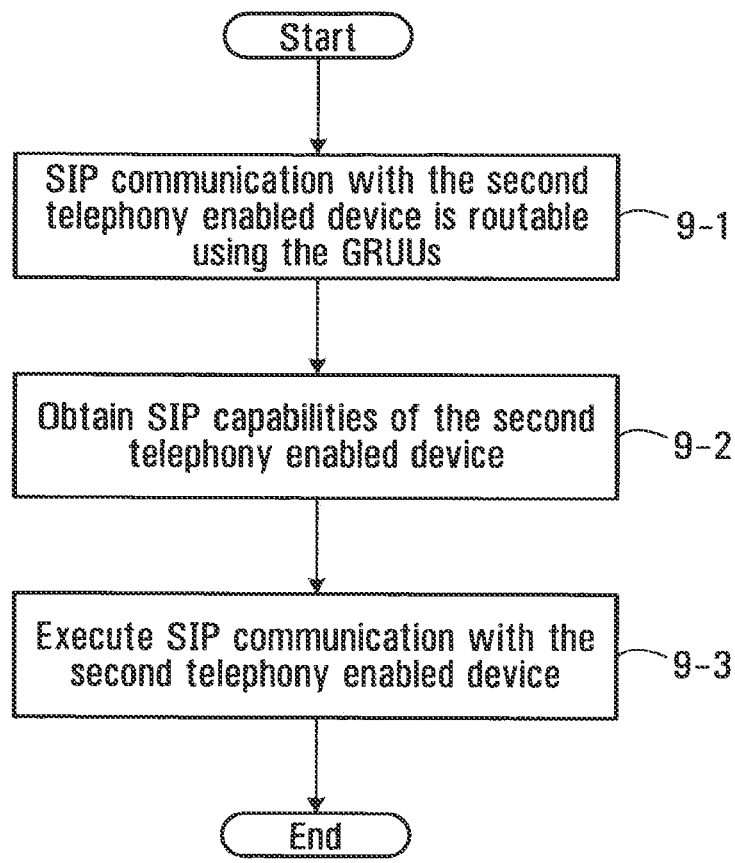
FIG. 9 is a flowchart of an example method of executing SIP communication between a first telephony-enabled device and a second telephony-enabled device.

Referring now to FIG. 9, shown is a flowchart of an example method of executing SIP communication between a first telephony-enabled device and a second telephony-enabled device (step 8-4 of FIG. 1). If the second GRUU is received, then at step 9-1 SIP communication between the first telephony-enabled device and the second telephony-enabled device is routable using the GRUUs. At step 9-2, the first telephony-enabled device obtains SIP capabilities of the second telephony-enabled device. This is accomplished, for example, by sending a SIP OPTIONS request message to the second GRUU. A return message indicates SIP capabilities of the second telephony-enabled device. At step 9-3, the first telephony-enabled device executes SIP communication with the second telephony-enabled device within the capabilities of the two telephony-enabled devices. This may include, for example, adding a SIP media component by sending a SIP INVITE request message addressed to the second GRUU.

Figure 10:
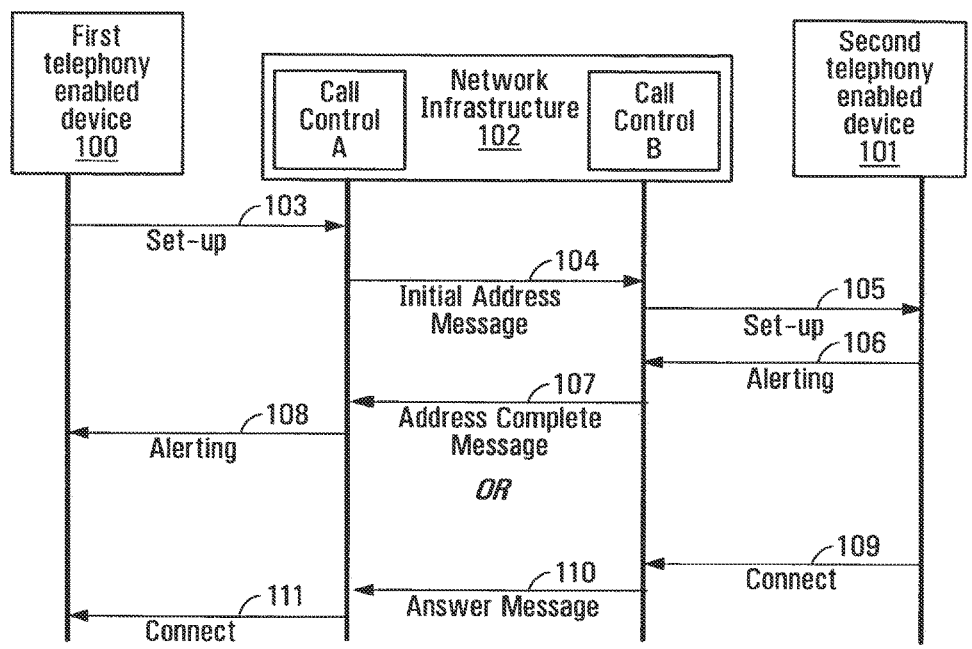
FIG. 10 is a signalling diagram of an example GRUU exchange between a first telephony-enabled device and a second telephony-enabled device.

Referring now to FIG. 10, shown is a signaling diagram of an example GRUU exchange between a first telephony-enabled device and a second telephony-enabled device. This example signaling demonstrates a successful exchange of GRUUs using ISUP messages. In the following, a "setup message", "initial address message", "alerting message", "address complete message", "connect message", and "answer message" are all examples of ISUP messages. ISUP messages contain a UUS (user to user signaling) information element. In some implementations, a GRUU is sent as an UUS information element in an ISUP message. The first telephony-enabled device 100 sends a first GRUU in a "setup message" 103 to the second telephony-enabled device 101. Within the network infrastructure 102, the call control A receives the "setup message" 103 and generates an "initial address message" 104 and sends it to the call control B. The call control B receives the "initial address message" 104, generates the "setup message" 105, and sends it to the second telephony-enabled device 101. The second telephony-enabled device 101 receives the "setup message" 105, which contains the first GRUU, and responds with an "alerting message" 106, which contains a second GRUU. The call control B receives the "alerting message" 106, generates an "address complete message" 107, and sends it to the call control A. The call control A receives the "address complete message" 107, generates the "alerting message" 108, and sends it to the first telephony-enabled device 100. Once the first telephony-enabled device 100 receives the "alerting message" 108, both telephony-enabled devices 100,101 have each other's GRUUs. The second telephony-enabled device 101 sends a "connect message" 109 to the first telephony-enabled device 100 if the second telephony-enabled device 101 is answering a call.

Figure 11:
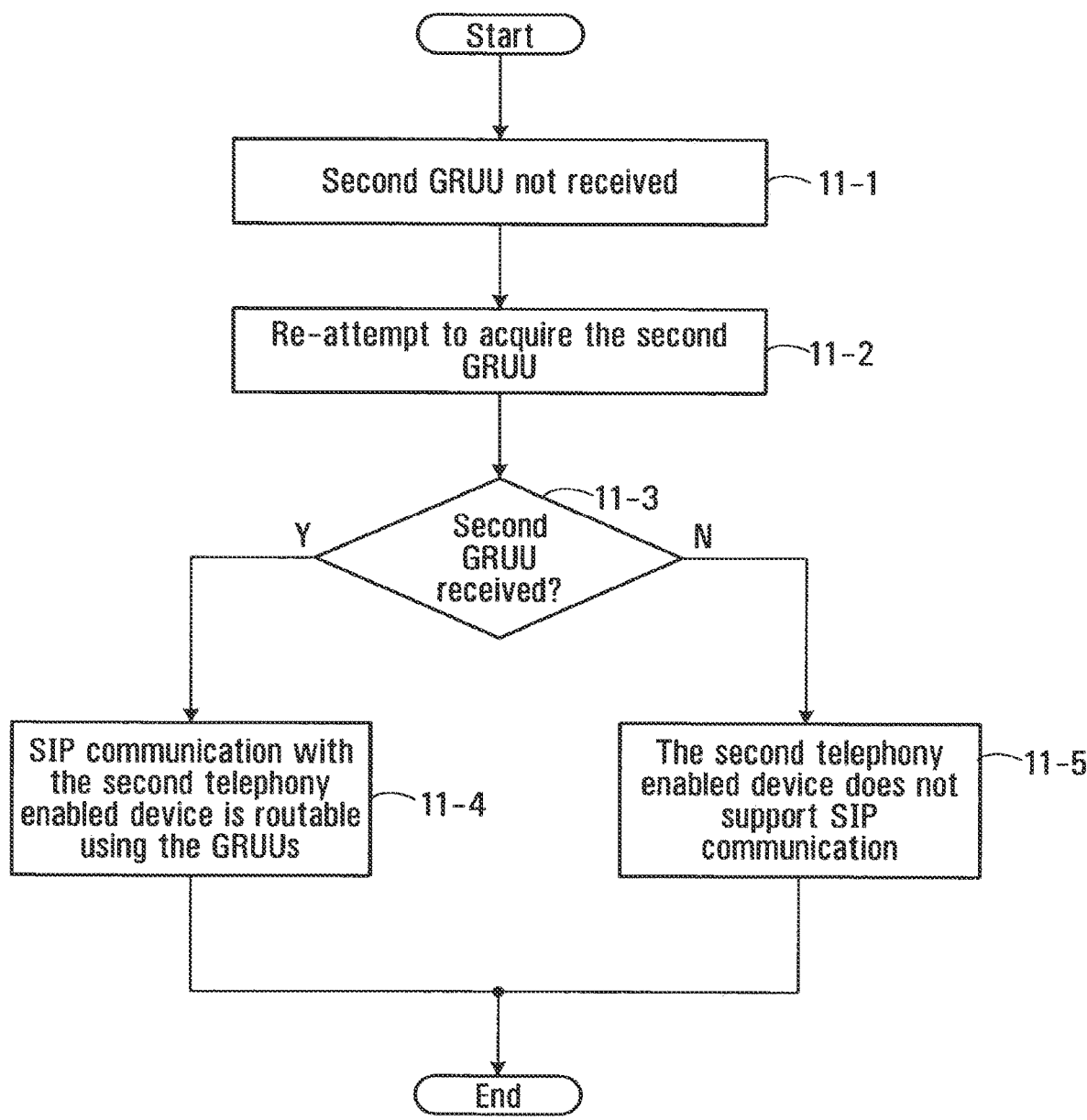
FIG. 11 is a flowchart of an example method of processing the absence of a response to the first GRUU transmission.

Referring now to FIG. 11, shown is a flowchart of an example method of processing the absence of a response to the first GRUU transmission (step 8-5 of FIG. 1). if the second GRUU is not received at step 11-1, then at step 11-2 the first telephony-enabled device re-attempts to acquire the second GRUU. If at step 11-3 the re-attempt to acquire the second GRUU succeeds, then at step 11-4 SIP communication with the second telephony-enabled device is routable using the GRUUs. However, if at step 11-3 the re-attempt to acquire the second GRUU does not succeed, then at step 11-5 the first telephony-enabled device determines that the second telephony-enabled device does not support SIP communication integrated with circuit switched communications.

There is no guarantee that if the first GRUU is sent to the second telephony-enabled device that it will be received. Furthermore, there is no guarantee that if the second telephony-enabled device receives the first GRUU that it will understand what to do with it. Therefore, in some embodiments, in absence of the second GRUU, the first telephony-enabled device re-sends the first GRUU using a different type of circuit switched message. In some embodiments, until a predetermined number of re-send messages are sent without receiving a response and the first telephony-enable device re-sends the first GRUU from time to time to the second telephony-enabled device via another circuit switched message.

Figure 12:
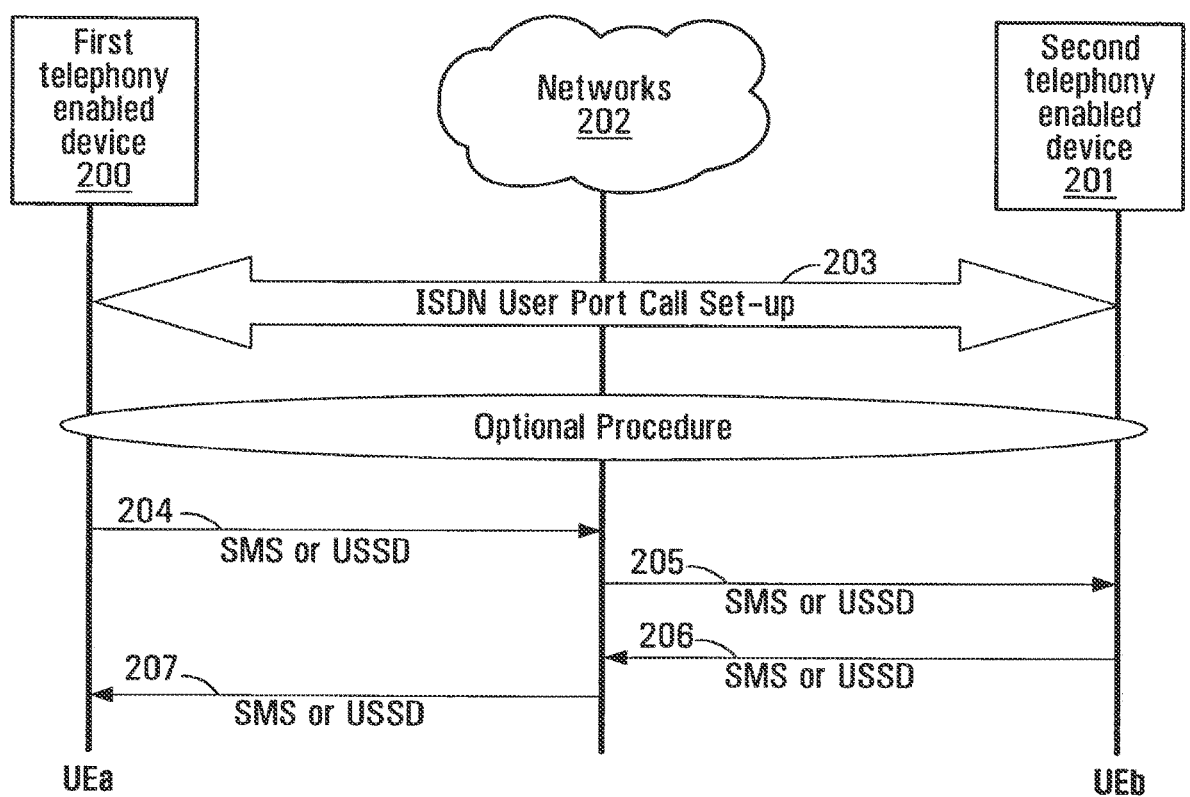
FIG. 12 is a signalling diagram of another example GRUU exchange between a first telephony-enabled device and a second telephony-enabled device.

Referring now to FIG. 12, shown is a signaling diagram of another example GRUU exchange between a first telephony-enabled device 200 and a second telephony-enabled device 201. This example signaling demonstrates possible re-attempts during an unsuccessful exchange of GRUUs. If the ISUP messages (i.e. ISDN user part call setup 203) does not succeed in exchanging GRUUs, then the first GRUU is sent to the second telephony-enabled device 201 via an SMS message, MMS message and/or USSD message 204. The networks 202 receive the SMS message, MMS message and/or USSD message 204 and generates a SMS message, MMS message and/or USSD message 205 for the second telephony-enabled device 201. For a successful reattempt to exchange GRUUs, the networks 202 receive the SMS message, MMS message and/or USSD message 206 from the second telephony-enabled device 201 and generates a SMS message, MMS message and/or USSD message 207 for the first telephony-enabled device 201.

In some implementations, the first telephony-enabled device sets a timer upon sending the set-up message. In some implementations, if the timer expires before the second GRUU is received, then the first telephony-enabled device sends the first GRUU along with other terminal capabilities to the second telephony-enabled device via a SMS or MMS message. In some implementations, the first telephony-enabled device sets a timer upon sending the set-up SMS or MMS message. In some implementations, if the timer expires before the second GRUU is received, then the first telephony-enabled device sends the first GRUU along with other terminal capabilities to the second telephony-enabled device via a USSD message. In other implementations, the first telephony-enabled device sends the first GRUU to the second telephony-enabled device via a plurality of circuit switched messages without waiting for any timer expiry. Other implementations can be contemplated.

Figure 13:
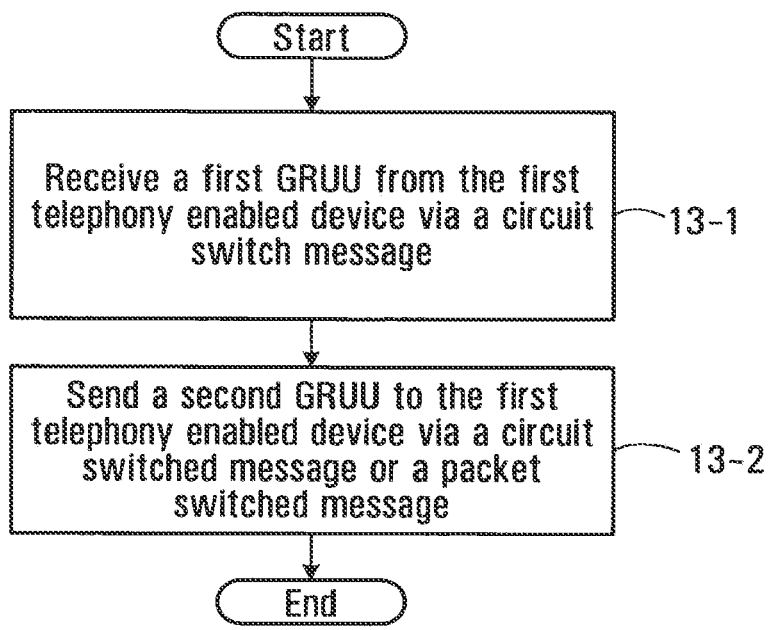
FIG. 13 is a flowchart of an example method of sending a second GRUU to a first telephony-enabled device upon receiving a first GRUU from the first telephony-enabled device.

With reference to FIGS. 8, 9, and 11, methods implemented in a first telephony-enabled device for exchanging GRUUs have been described. The second telephony-enabled device has been described to participate in the exchange of GRUUs. Referring now to FIG. 13, shown is a flowchart of an example method of sending a second GRUU to a first telephony-enabled device upon receiving a first GRUU from the first telephony-enabled device. This method may be implemented in a telephony-enabled device, for example by the call processing function 12 of the telephony-enabled device 10 or by the call processing function 22 of the wireless device 20. At step 13-1, a first GRUU is received from the first telephony-enabled device via a circuit switched message, then at step 13-2 a second GRUU is sent to the first telephony-enabled device via a circuit switched message.

As described previously with reference to FIG. 8, there are many kinds of circuit switched messages that can be received and sent for exchanging GRUUs. In some implementations, the second telephony-enabled device sends the second GRUU using the same kind of circuit switched message as the received circuit switched message. For example, if an ISUP message containing the first GRUU is received, then the second telephony-enabled device sends the second GRUU via an ISUP message. As another example, if a MT (mobile terminated) SMS message containing the first GRUU is received, then the second telephony-enabled device sends the second GRUU via a MO (mobile originated) SMS message.

With reference to FIGS. 8, 9, and 11, methods implemented in a first telephony-enabled device for exchanging GRUUs have been described. With reference to FIG. 13, a method implemented in a second telephony-enabled device has been described. In some embodiments, a telephony-enabled device implementing the methods of FIGS. 8, 9, and 11 as an initiator of GRUU exchange also implement the methods of FIG. 13 as a non-initiator of GRUU exchange and vice versa. Labeling a telephony-enabled device as being a "first" or a "second" telephony-enabled device is arbitrary. More generally, all methods described with reference to a "first" or a "second" telephony-enabled device may be implemented in any telephony-enabled device.

Wireless Network Handoff

The use of GRUUs to add packet switched communication to an existing circuit switched communication has been described. The scenario of using GRUUs to handoff circuit switched communication to packet switched connection will now be described with reference to FIGS. 14 and 15.

Figure 14:
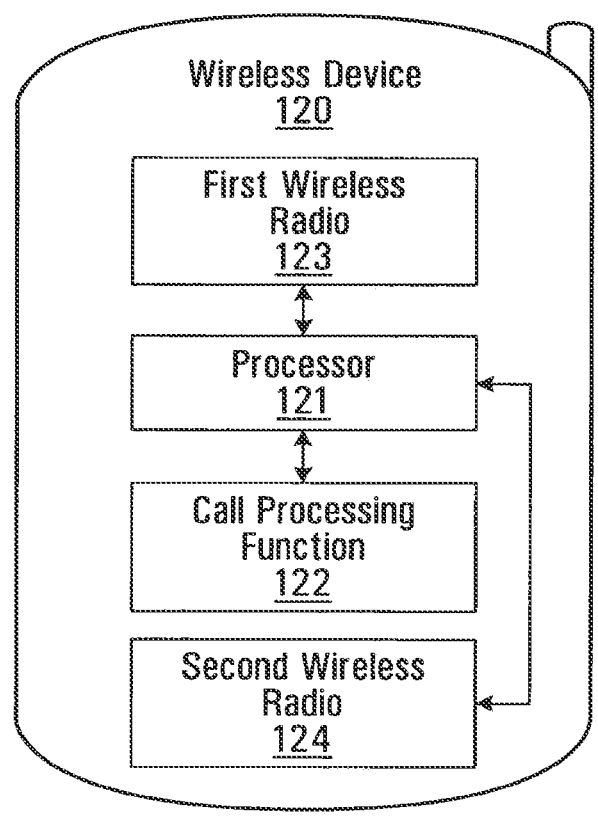
FIG. 14 is a block diagram of another example wireless device adapted to exchange GRUUs with another telephony-enabled device.

Referring now to FIG. 14, shown is a block diagram of another example wireless device 120 adapted to exchange GRUUs with another telephony-enabled device. The wireless device 120 has a processor 121 coupled to a first wireless radio 123, a call processing function 122, and a second wireless radio 124.

In operation, the wireless device 120 is adapted to perform all functionality previously described for the wireless device 20 of FIG. 2. Therefore, this description is not repeated here. The first wireless radio 123 is adapted to communicate with a wireless circuit switched network, for example a cellular network (not shown). The second wireless radio 124 is adapted to communicate with a wireless packet switched network, for example a WLAN (wireless local area network) (not shown) or a BT (Bluetooth) network (not shown). Communicating with a particular wireless network can be implementation specific. In the case of communicating with a WLAN network, the second wireless radio 124 may be a WLAN radio. In the case of communicating with a BT network, the second wireless radio 124 may be a BT radio.

The wireless device 120 shows only functionality relevant to the aspects described herein. It is to be understood that practical implementations would include additional functionality to that shown.

Figure 15:
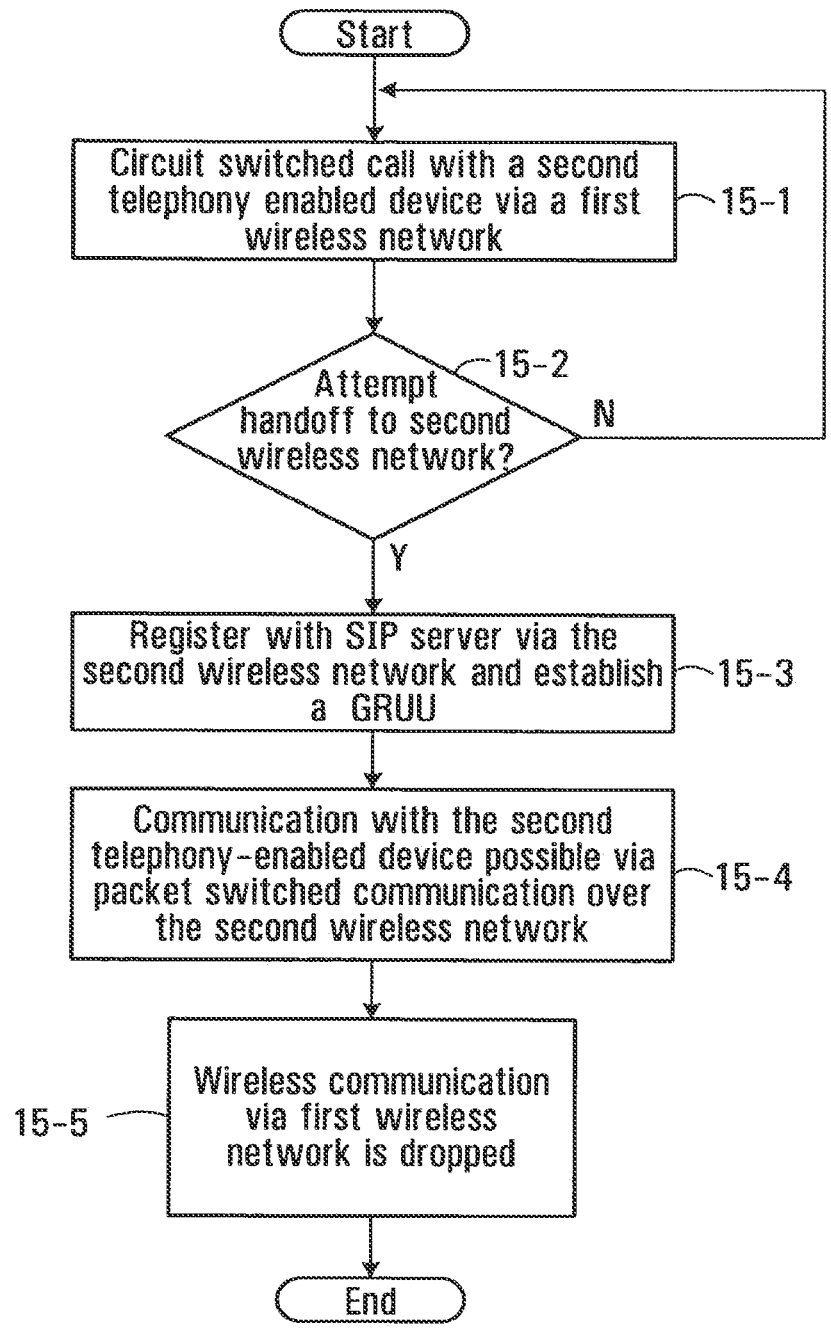
FIG. 15 is a flowchart of an example method of handing off communication from a circuit switched network to a packet switched network.

Referring now to FIG. 15, shown is a flowchart of an example method of handing off communication from a circuit switched network to a packet switched network. This method may be implemented in a wireless device capable of communicating with a wireless circuit switched network and a packet switched network, for example by the call processing function 122 of the wireless device 120 shown in FIG. 14.

At step 15-1, the wireless device is in a circuit switched call with a second telephony-enabled device via a circuit switched network. If at step 15-2 the wireless device determines that it should attempt to handoff communications to a packet switched network, then at step 15-3 the wireless device registers with a SIP server via the packet switched network and obtains a GRUU if the wireless device has not already done so prior to determining that it should attempt to handover communication to the packet switched network. At step 15-4, communication with the second telephony-enabled device is possible via packet switched communication, for example VoIP (voice over IP) via SIP signaling messages, over the packet switched network. Generally, it is the SIP signaling messages that are addressed using the GRUU and then via the signaling messages the IP addresses for the VoIP or other session data are negotiated. At step 15-5, the wireless communication via the circuit switched network is dropped. The second telephony-enabled device is unaware that the wireless device has handed over communication to the packet switched network.

There are many ways in which the wireless device may determine that it should attempt to handoff communication to the packet switched network. In some implementations, if signal strength from the circuit switched network has degraded and a packet switched network is readily available, then the wireless device attempts to switch to the packet switched network.

There are many possibilities for the circuit switched network and the packet switched network. For example, the circuit switched network may be a GSM (global system for mobile communications) network or UMTS (Universal Mobile Telecommunications System) or CDMA 2000 network and the packet switched network may include a WLAN (wireless local area network) or a PAN (personal area network).

There are many ways in which the wireless device may acquire the GRUU. Many ways of obtaining GRUUs have already been discussed and are therefore not repeated.

In the example method described with reference to FIG. 15, the wireless device determines whether or not it should handoff communication to a packet switched network. In other embodiments, the network infrastructure determines whether or not the wireless device should handoff communication to a packet switched network.

Figure 16:
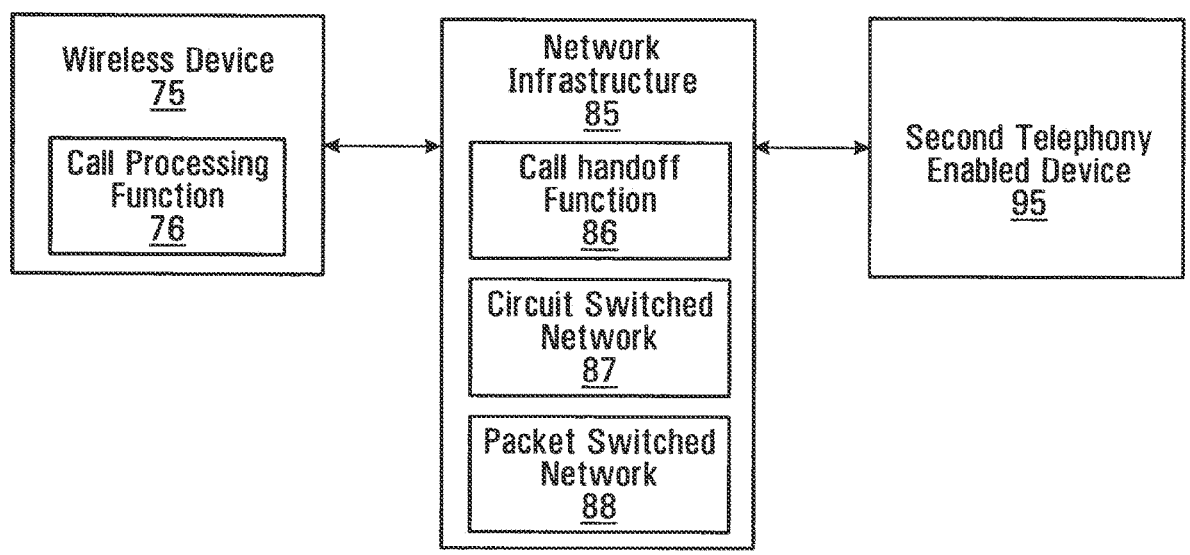
FIG. 16 is a block diagram of an example telephony network in which a network infrastructure determines whether or not a wireless device should switch communication to a packet switched network.

Referring now to FIG. 16, shown is a block diagram of an example telephony network in which a network infrastructure determines whether or not a wireless device should handover communication from a circuit switched network to a packet switched network. The network infrastructure 85 is coupled to a wireless device 75 and a second telephony-enabled device 95. The first telephony-enabled device 75 has a call processing function 76. The network infrastructure 85 has a call handoff function 86, a circuit switched network 87, and a packet switched network 88. In some embodiments, the call handoff function 86 is implemented in a SIP server (not shown) residing within the network infrastructure 85.

The circuit switched network 87 and the packet switched network 88 provide infrastructure for allowing the wireless device 75 and the second telephony-enabled device 95 to communicate using circuit switched communications and packet switched communications simultaneously or separately. More particularly, the wireless device 75 is provided with infrastructure for allowing wireless circuit switched communications and wireless packet switched communications simultaneously or separately. The network infrastructure 85 may have components and functionality further to that shown. The network infrastructure 85 includes wireless access infrastructure and may include wireless and/or wireline PSTN (public switched telephone network) equipment and private or public packet network infrastructure.

The wireless device 75 may be any wireless device capable of circuit switched communication with the circuit switched network 87 and packet switched communication with the packet switched network 88. The wireless device 75 is also capable of having packet switched communications routed to it using a GRUU. As described previously, the GRUU can be generated locally by the wireless device or by the network infrastructure. The GRUU can also be generated by a SIP server residing within the network infrastructure. The wireless device may, for example, be the wireless device 120 shown in FIG. 14.

While only two telephony enabled devices are shown, the network infrastructure would support multiple such devices. The connections between the devices and the infrastructure may be permanent or dynamic in nature.

In operation, during a circuit switched call between the wireless device 75 and the second telephony-enabled device 95, the network infrastructure 85 determines whether or not the wireless device should hand off communication from a circuit switched network to a packet switched network.

Figure 17:
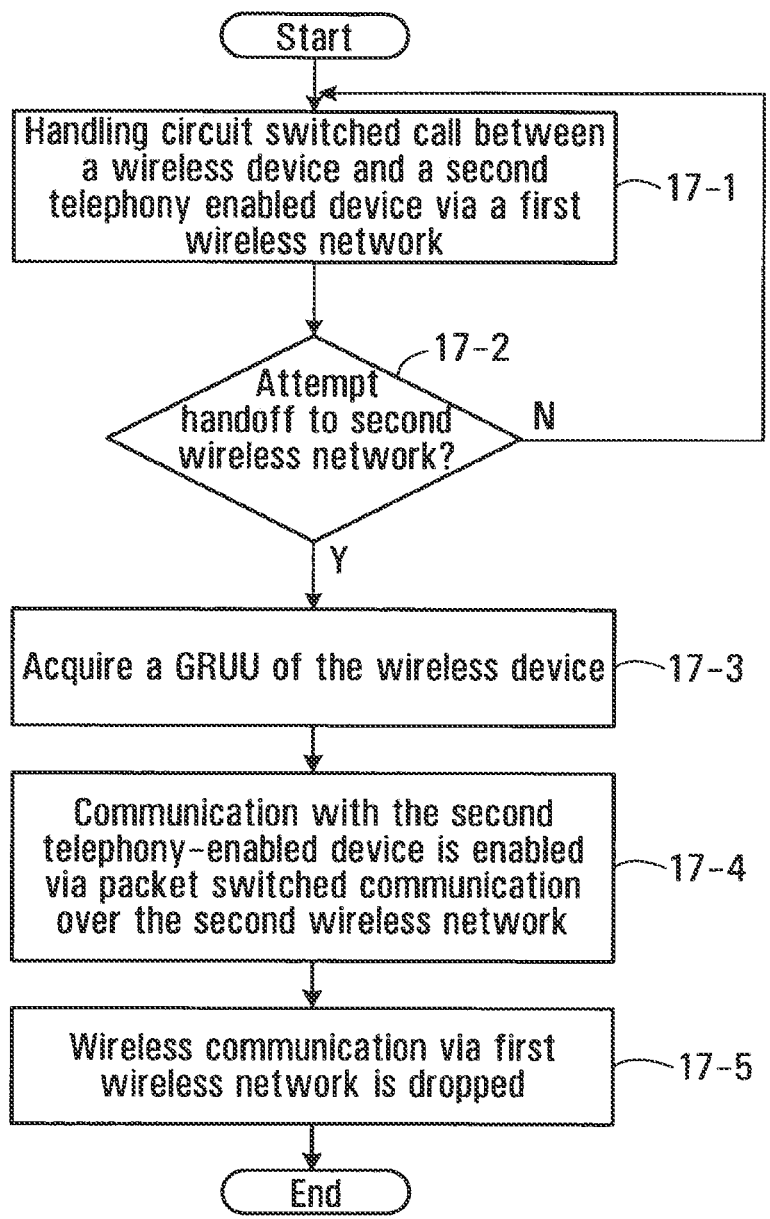
FIG. 17 is a flowchart of an example method of handing off communication from a circuit switched network to a packet switched network.

Referring now to FIG. 17, shown is a flowchart of an example method of handing off communication from a circuit switched network to a packet switched network. This method may be implemented in a network infrastructure, for example by the call handoff function 86 of the network infrastructure 85 of FIG. 16. More generally, this method may be implemented in any appropriate wireless network element (not shown) with a call handoff function within the network infrastructure 85 of FIG. 16.

At step 17-1, the network infrastructure is handling a circuit switched call between a wireless device and a second telephony-enabled device. The wireless device communicates during the circuit switched call via a circuit switched network. If at step 17-2 the network infrastructure determines that it should attempt to handoff communication to the packet switched network, then at step 17-3 the network infrastructure acquires a GRUU for the wireless device if the network infrastructure has not already done so prior to determining that it should attempt to handover communication to the packet switched network. At step 17-4, packet switched communications, for example VoIP (voice over TP) via SIP signaling messages, can be routed to the wireless device via the packet switched network using the GRUU. The GRUU is acquired using any manner previously discussed. At step 17-5, the communication via the circuit switched network is dropped. The second telephony-enabled device remains unaware that the network infrastructure has handed over communication to the packet switched network.

There are many ways in which the network infrastructure may determine if it should attempt to hand over communication from the circuit switched network to the packet switched network. In some implementations, if wireless access network signal strength to and from the wireless device has degraded and packet switched network access is readily available, then the network infrastructure attempts to hand over the communication to the packet switched network.

There are many possibilities for the circuit switched network and the packet switched network. For example, the circuit switched network may be a GSM (global system for mobile communications) network or UMTS (Universal Mobile Telecommunications System) or CDMA 2000 network. The packet switched network may include a WLAN (wireless local area network) or a PAN (personal area network).

Wireless Network Handoff Via Gateway

Figure 18:
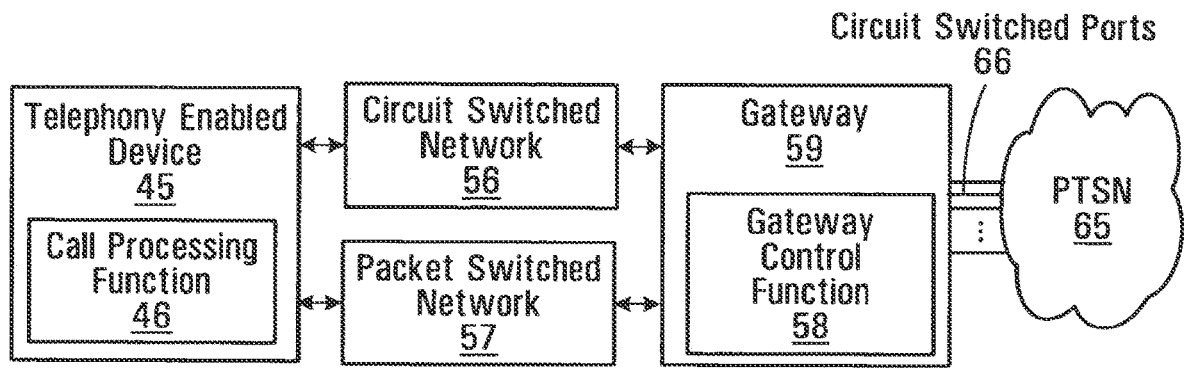
FIG. 18 is a block diagram of an example telephony network in which a telephony-enabled device may route SIP communications using a GRUU to a common gateway used by the telephony-enabled device for a circuit switch call.

Referring now to FIG. 18, shown is a block diagram of an example telephony network in which a telephony-enabled device may route SIP communications using a GRUU to a common gateway used by the telephony-enabled device for both circuit switch and packet switched communication. A telephony-enabled device 45 has a call processing function 46. The telephony-enabled device 45 is capable of communicating using a circuit switched network 56 and a packet switched network 57, which are each coupled to a gateway 57. The gateway 57 has a gateway control function 58 and a plurality of circuit switched ports 66 to a PSTN (publicly switched telephone network) 65.

In operation, the telephony-enabled device 45 is adapted to communicate using circuit switched and packet switched communications separately or simultaneously using the circuit switched network 56 and the packet switched network 57. Circuit switched communication may include, for example, a voice call. Packet switched communication may include any data, for example, streaming video data or VoIP (Voice over IP). The gateway control function 58 is adapted to acquire a GRUU for each circuit switch port 66 and use it for mapping to circuit switched calls for PSTN interworking. In some embodiments, the gateway control function 58 is software implemented and is executed by a processor. However, more generally, the gateway control function 58 may be implemented as software, hardware, firmware, or as any appropriate combination of software, hardware and firmware.

In some implementations, the gateway is a combined SIP media gateway controller and gateway MSC (mobile switching centre). In other implementations, a SIP media gateway controller and a gateway MSC are implemented as separate components.

Figure 19:
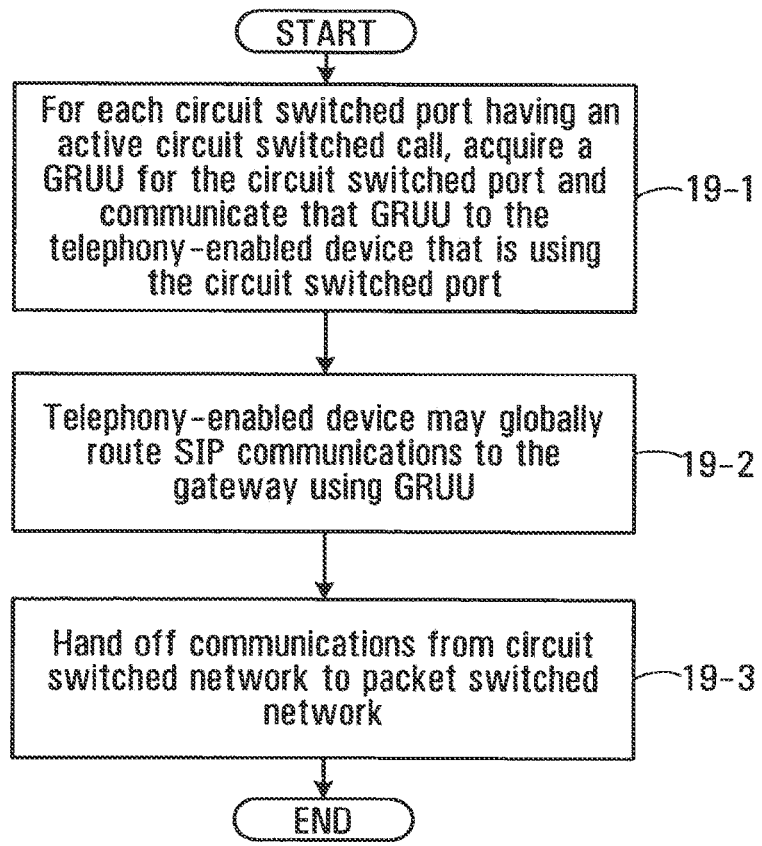
FIG. 19 is a flowchart of an example method of handing off communication from a circuit switched network to a packet switched network by establishing SIP communication between a telephony-enabled device and a gateway.

Referring now to FIG. 19, shown is a flowchart of an example method of handing off communication from a circuit switched network to a packet switched network by establishing SIP communication between a telephony-enabled device and a gateway. This method may be implemented in a gateway, for example by the gateway control function 58 of the gateway 59 shown in FIG. 18. At step 19-1, for each circuit switched port having an active circuit switched call, the gateway acquires a GRUU for the circuit switched port and communicates the GRUU to the telephony-enabled device involved with the circuit switched communication over the circuit switched port. At step 19-2, the telephony-enabled device is able to route SIP communications, for example VoIP via SIP signaling messages, to the circuit switched port of the gateway via the packet switched network using the received GRUU. The gateway provides a mapping between the SIP communications from the telephony-enabled device and the circuit switched port. The gateway may use a received GRUU from the telephony-enabled device to route circuit switched communications from the circuit switched port to the telephony-enabled device via the packet switched network. At step 19-3, the circuit switched communications is replaced by the SIP communications. Communications from the circuit switched network to the packet switched network has been handed off.

As previously described, the GRUUs may be generated within a telephony-enabled device, for example by a call processing function of a telephony-enabled device, or within the network infrastructure, for example by a gateway control function of a gateway.

OTHER EMBODIMENTS

Many references to SIP and SIP communications have been made throughout. However, more generally, implementations are contemplated in which any packet-switched communication is utilized. Other packet-switched communication protocols can be contemplated with implementation-specific and/or protocol-specific modifications apparent to one ordinarily skilled in the art. Examples of other packet-switched communication protocols that may be implemented include H.323, and MGCP (Media Gateway Control Protocol).

Previous examples have illustrated that a GRUU can be sent in a circuit switched message, for example a "setup" ISUP message. Various circuit switched messages, in some implementations, may have transport limitations that limit the size of a GRUU that can be sent. In such cases, depending on the size of a GRUU, the GRUU may be too large for transport by a single circuit switched message. There are many ways to overcome such limitations. In some implementations, a GRUU is compressed using any appropriate compression function. In other implementations, a GRUU is truncated so that its size is sufficiently small enough for transport while allowing the receiving party to deduce the truncated part. In other implementations, the GRUU is split into two or more components for transport in separate circuit switched messages. In other implementations, multiple of the above implementations are employed. Transformations to limit the size of a GRUU may be implemented locally within a telephony-enabled device, or within a network infrastructure.

Numerous modifications and variations of the present application are possible in light of the above teachings. It is therefore to be understood that within the scope of the appended claims, the application may be practised otherwise than as specifically described herein.

COPYRIGHT NOTICE

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

We claim:

1. A method in a first mobile device for handing off a circuit switched (CS) communication with a second mobile device from a CS network to a packet switched (PS) network, the method comprising:
   determining that the first mobile device should attempt to handoff the CS communication to the PS network;
   sending a first identity, wherein the first identity is sent in an information element of a cellular protocol message;
   sending a Session Initiation Protocol (SIP) message for a PS communication, the SIP message including a second identity in a format of a Unified Resource Name (URN) in an instance identifier (ID) contained within the SIP message, wherein the CS communication and the PS communication originate from the mobile device when the first identity matches the second identity;
   continuing the PS communication with the second mobile device via the PS network; and
   dropping the CS communication with the second mobile device.

2. The method according to claim 1, wherein the first identity comprises a first International Mobile Equipment Identity (IMEI) and the second identity comprises a second IMEI.

3. The method according to claim 2, wherein the IMEI uniquely identifies the first mobile device.

4. The method according to claim 2, wherein the IMEI uniquely identifies the first mobile device as a participant in the CS communication over a cellular network and as a source in the PS communication over a PS network.

5. The method according to claim 1, further comprising:
sending the cellular protocol message from the first mobile device to a cellular network.

6. The method according to claim 1, further comprising:
sending the SIP message from the first mobile device to a PS network.

7. The method according to claim 1, wherein the CS communication comprises a voice call and the PS communication comprises at least one of streaming video data and a Voice over IP (VoIP) communication.

8. The method according to claim 1, wherein the cellular telephony protocol message is configured in accordance with an unstructured supplementary service data message protocol.

9. The method according to claim 1, wherein the cellular protocol message is configured in accordance with a short message service message protocol.

10. The method according to claim 1, wherein the cellular protocol message is configured in accordance with a multimedia message service message protocol.

11. A mobile device for handing off a circuit switched (CS) communication with a second mobile device from a CS network to a packet switched (PS) network, the mobile device comprising a wireless radio, the mobile device being configured to:
determine that the mobile device should attempt to handoff the CS communication to the PS network;
send, by the wireless radio, a first identity wherein the first identity is sent in an information element of a cellular protocol message;
send, by the wireless radio, a Session Initiation Protocol (SIP) message for a PS communication, the SIP message including a second identity in a format of a Unified Resource Name (URN) in an instance identifier (ID) contained within the SIP message, wherein the CS communication and the PS communication originate from the mobile device when the first identity matches the second identity;
continue the PS communication with the second mobile device via the PS network; and
drop the CS communication with the second mobile device.

12. The mobile device according to claim 11, wherein the first identity comprises a first International Mobile Equipment Identity (IMEI) and the second identity comprises a second IMEI.

13. The mobile device according to claim 12, wherein the IMEI uniquely identifies the mobile device.

14. The mobile device according to claim 12, wherein the IMEI uniquely identifies the mobile device as a participant in the CS communication over a cellular network and as a source in the PS communication over a PS network.

15. The mobile device according to claim 11, wherein the mobile device is further configured to:
send, by the wireless radio, the cellular protocol message from the mobile device to a cellular network.

16. The method according to claim 11, wherein the mobile device is further configured to:
send, by the wireless radio, the SIP message from the mobile device to a PS network.

17. The method according to claim 11, wherein the CS communication comprises a voice call and the PS communication comprises at least one of streaming video data and a Voice over IP (VoIP) communication.

18. The method according to claim 11, wherein the cellular protocol message is configured in accordance with an unstructured supplementary service data message protocol.

19. The mobile device according to claim 11, wherein the cellular protocol message is configured in accordance with a short message service message protocol.

20. The mobile device according to claim 11, wherein the cellular protocol message is configured in accordance with a multimedia message service message protocol.

* * * * *

UNITED STATES PATENT AND TRADEMARK OFFICE
CERTIFICATE OF CORRECTION

PATENT NO. : 11,575,719 B2
APPLICATION NO. : 17/520409
DATED : February 7, 2023
INVENTOR(S) : Andrew Michael Allen and Adrian Buckley It is certified that error appears in the above-identified patent and that said Letters Patent is hereby corrected as shown below:

In the Claims

In Column 20, Line 23, In Claim 16, delete "method" and Insert -- mobile device --, therefor.

In Column 20, Line 26, In Claim 17, delete "method" and Insert -- mobile device --, therefor.

In Column 20, Line 30, In Claim 18, delete "method" and Insert -- mobile device --, therefor.

Signed and Sealed this
Twenty-first Day of March, 2023

Katherine Kelly Vidal
*Director of the United States Patent and Trademark Office*